(No Model.) 5 Sheets—Sheet 1.

H. LINDLEY & T. BROWETT.
LIQUID HYDROCARBON MOTOR ENGINE.

No. 440,485. Patented Nov. 11, 1890.

Witnesses
Inventors (No Model.) 5 Sheets—Sheet 2.

H. LINDLEY & T. BROWETT.
LIQUID HYDROCARBON MOTOR ENGINE.

No. 440,485. Patented Nov. 11, 1890.

Witnesses.
Inventors.

(No Model.) 5 Sheets—Sheet 3.

H. LINDLEY & T. BROWETT.
LIQUID HYDROCARBON MOTOR ENGINE.

No. 440,485. Patented Nov. 11, 1890.

Witnesses.
J. B. Boardley
Fred Cliffe

Inventors
H Lindley
Thomas Browett (No Model.)                    5 Sheets—Sheet 4.

H. LINDLEY & T. BROWETT.
LIQUID HYDROCARBON MOTOR ENGINE.

No. 440,485.           Patented Nov. 11, 1890.

(No Model.) 5 Sheets—Sheet 5.
H. LINDLEY & T. BROWETT.
LIQUID HYDROCARBON MOTOR ENGINE.
No. 440,485. Patented Nov. 11, 1890.
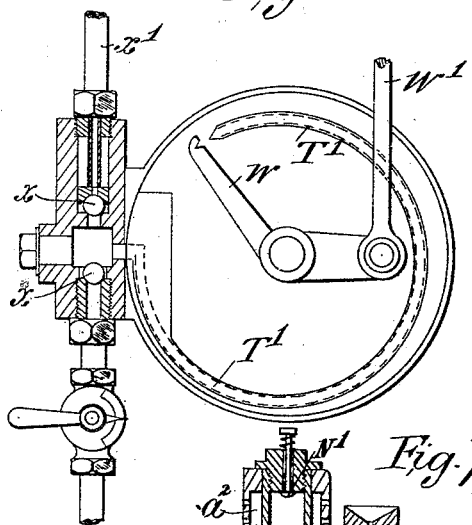
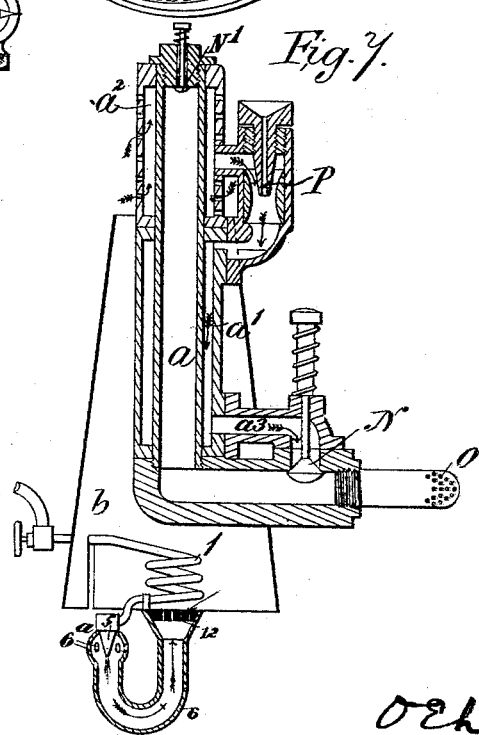

UNITED STATES PATENT OFFICE.

HERBERT LINDLEY AND THOMAS BROWETT, OF SALFORD, ENGLAND.

LIQUID-HYDROCARBON MOTOR-ENGINE.

SPECIFICATION forming part of Letters Patent No. 440,485, dated November 11, 1890.

Application filed August 25, 1890. Serial No. 362,967. (No model.) Patented in England November 6, 1888, No. 16,057; in France October 30, 1889, No. 201,655, and in Belgium October 30, 1889, No. 88,262.

*To all whom it may concern:*

Be it known that we, HERBERT LINDLEY and THOMAS BROWETT, subjects of the Queen of Great Britain and Ireland, both residing at Salford, in the county of Lancaster, England, have invented Improvements in Liquid-Hydrocarbon Motor-Engines, (for which we have obtained the following patents: Great Britain, No. 16,057, dated November 6, 1888; France, No. 201,655, dated October 30, 1889, and Belgium, No. 88,262, dated October 30, 1889,) of which the following is a specification.

This invention has for its object to render liquid-hydrocarbon engines—that is, motor-engines having for the source of power petroleum, benzoline, or other liquid hydrocarbon—more simple in construction and more certain and economical in their action than has heretofore been usual, as well as to permit the use of liquid hydrocarbons having a high specific gravity and a high flashing-point and such as are easily obtainable.

Our invention is applicable not only to engines working on the two-cycle system, but also to engines working on the three-cycle system. Both of these cycles are well understood.

In order that the apparatus hereinafter described for the production and heating of hydrocarbon spray may be advantageously adapted to a two-revolution engine, there must be provision for the production of vacuum in the cylinder during the charge-stroke. This can be done by restricting the passages that supply air to such cylinder, whether such air be admitted before, after, or simultaneously with the spray or vapor.

In order that our invention may be clearly understood, reference is had to the accompanying drawings, in which—

Figure 1:
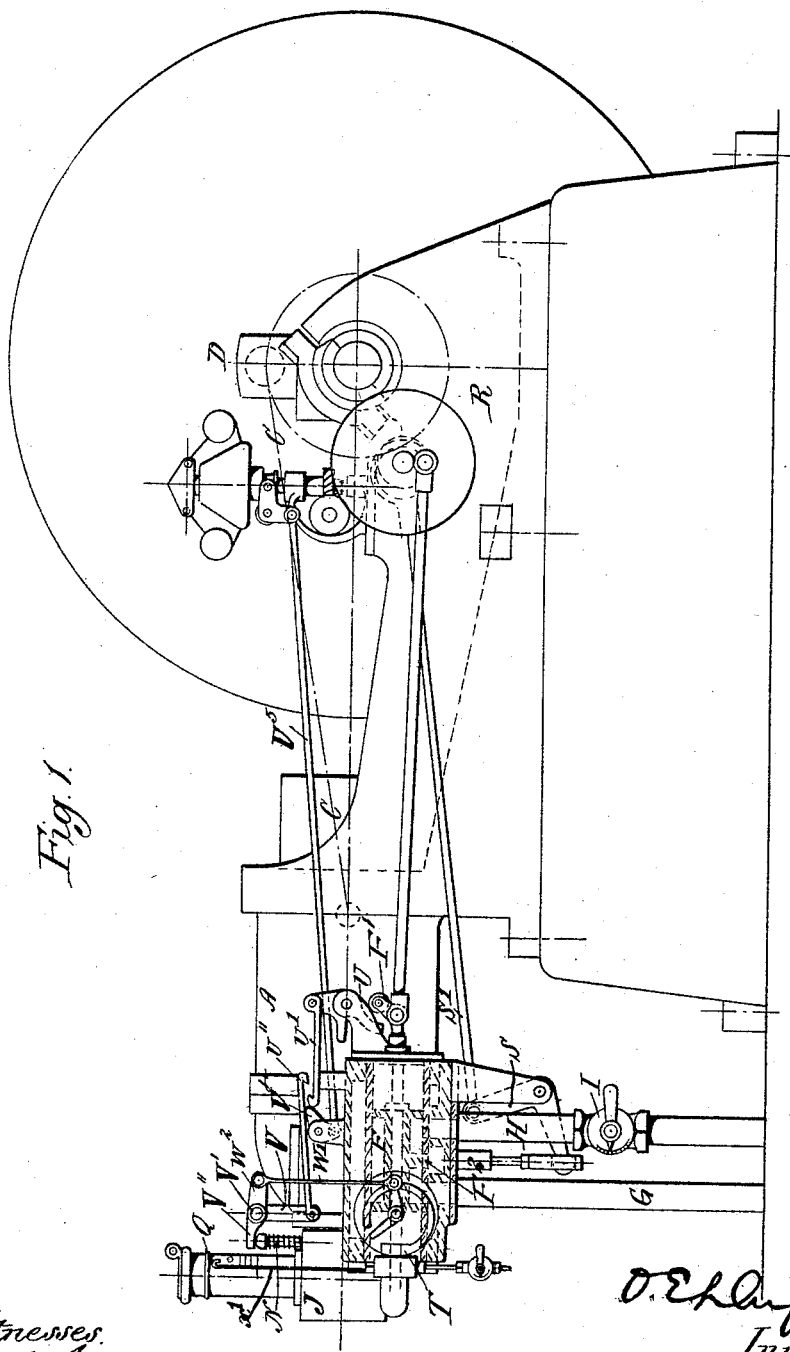
Figure 2:
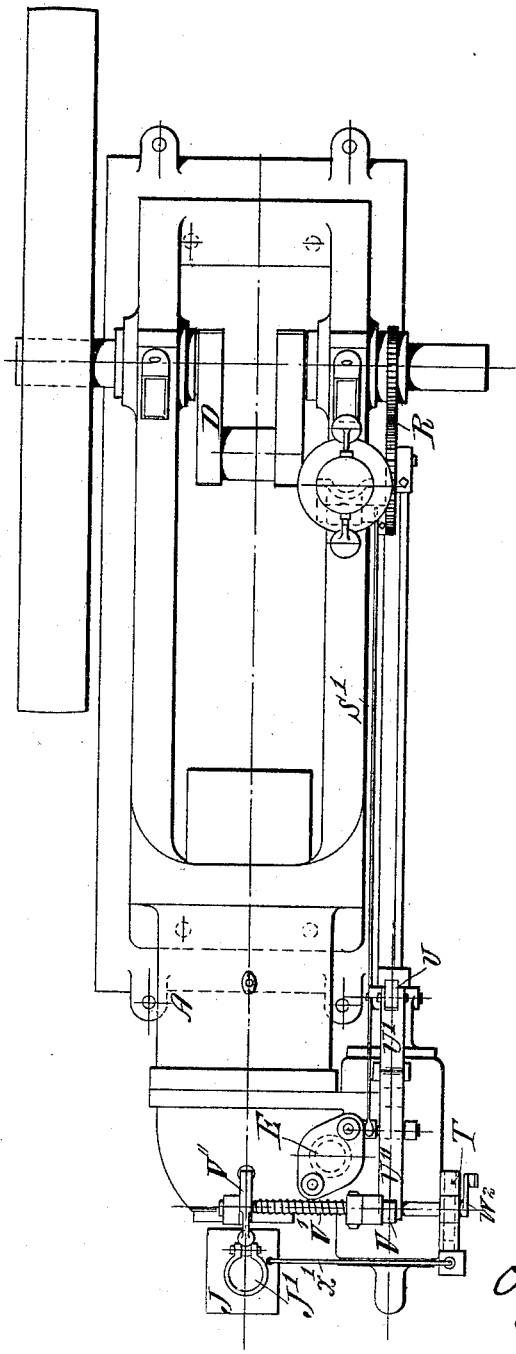
Figure 3:
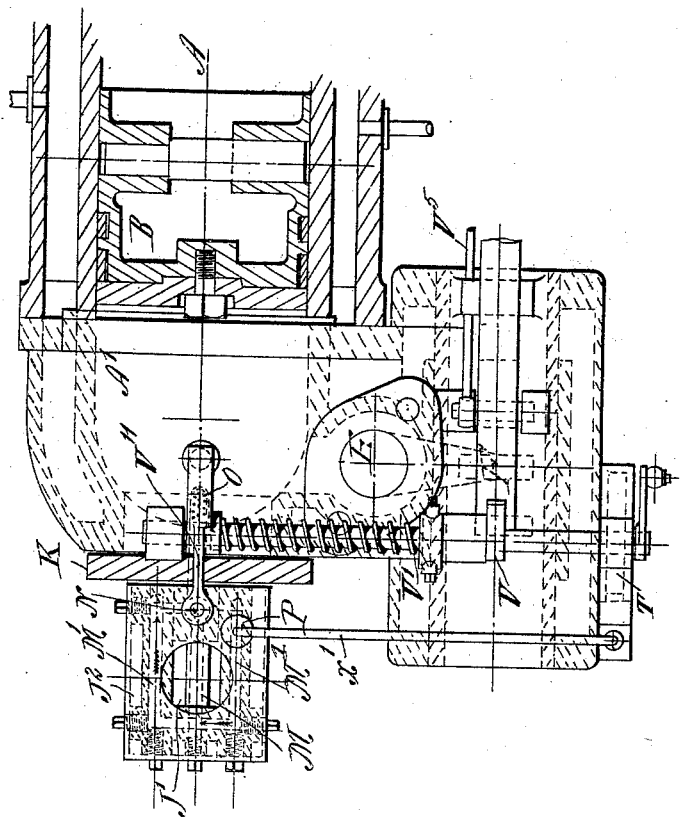
Figure 4:
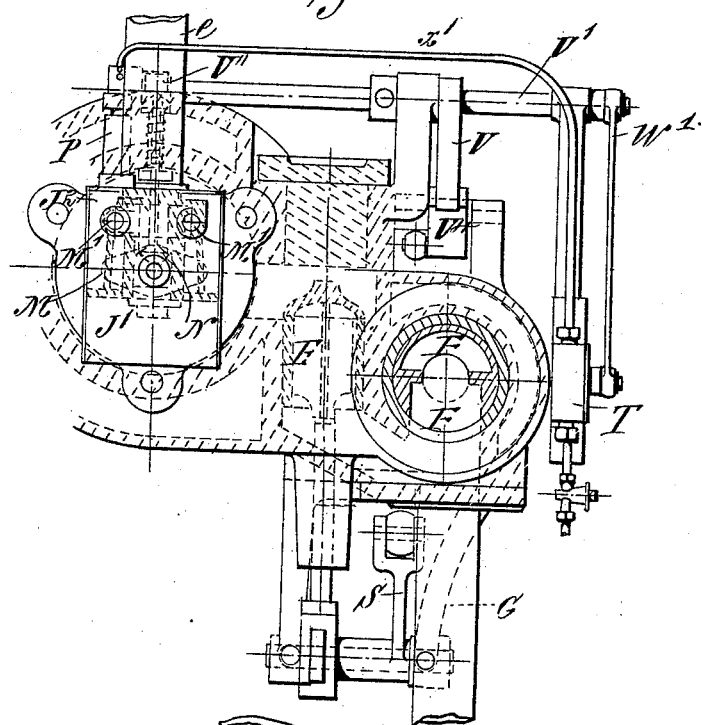
Figure 5:
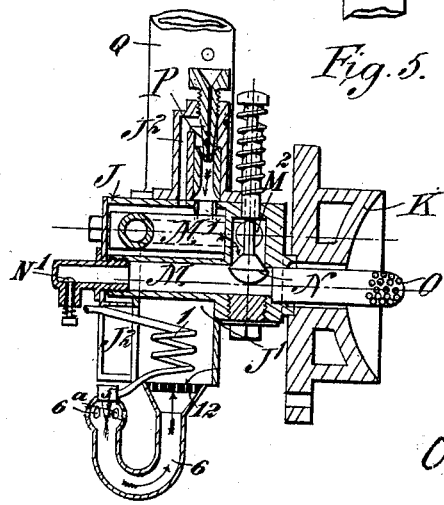

Figures 1 and 2 are respectively a side elevation, partly in section and a plan, of an engine constructed according to our invention. These figures show the pump or measuring device together with one form of heater as applied to an engine working on the two-revolution cycle. These features would be the same when used on an engine having a flushing-stroke and known as the "triple cycle." Figs. 3 and 4 are respectively plan and end views, both partly in section and drawn to an enlarged scale, of a portion of the cylinder and connected parts. Fig. 5 is a vertical section, also to an enlarged scale, of the cylinder-cover and heating device applied thereto, together with a special construction of lamp hereinafter referred to, but not claimed as forming part of the present invention. Fig. 6 shows, partly in vertical section and partly in side elevation, also to an enlarged scale, a pump constructed according to this invention for delivering measured or definite quantities of hydrocarbon to an atomizer or spray-injector. Fig. 7 is a vertical section of a modified form of heating device.

In Figs. 1 to 6, A is the motor-cylinder, provided with a piston B, connected by a rod C to the crank-shaft D, which runs in bearings on a suitable frame in a manner now well understood. The cylinder A is provided with a clearance-space A' at the end farthest from the crank-shaft, into which space the contents of the cylinder may be compressed. The cylinder is also provided with a valve E, which is mechanically moved, and serves both as an exhaust-valve and as an air-admission valve. F is a sliding piston-valve that serves to direct the exhaust gases into the exhaust-pipe G, when necessary, and also to connect the air-pipe H with the under side of the valve E when air is required to be drawn into the cylinder, the combination of sliding valve F and lift-valve E being the same as is described in the specification of British Letters Patent granted to us, dated May 22, 1888, and numbered 7,547. We may, however, dispense with the sliding valve F and use in lieu thereof an air-valve of the ordinary lift-type, either acting automatically or moved mechanically to allow air to pass into the cylinder and mix with the vapor from the heaters on the charge or suction stroke of the engine, the valve E being then retained merely as an exhaust-valve. In either case the air-pipe H may be supplied with a cock or valve I for the purpose of restricting, when necessary, the supply of air to the cylinder for the purpose of creating therein a partial vacuum or diminution of pressure.

For the purpose of heating the spray in its passage from the spray-injector P, hereinafter mentioned, to the cylinder A, we employ a heating device comprising a vessel capable of being heated by a lamp and into which the charge of hydrocarbon is delivered, a tube or conduit in communication with the said cylinder, a pipe or passage connecting the said vessel with the tube or conduit, and a valve whereby the said pipe or passage can be controlled.

The arrangement of heating device shown in Figs. 3, 4, and 5 comprises a casting J, formed with tubular parts M′, constituting a vessel capable of being heated by a lamp below and into which the charge of hydrocarbon is introduced by the spray-injector P or other suitable device, a tube or conduit M in communication with the cylinder, and a pipe or passage $M^2$, connecting the tubular parts M′ with the tube or conduit M.

N is a check-valve that controls the pipe or passage $M^2$. The casting J is secured to the outer side of the cylinder-cover K, which may advantageously be insulated from the cylinder by means of an asbestus joint, so as not to have its temperature lowered by contact with the cooler walls of the cylinder, which are made for water-circulation, as is usual in gas-engines. The casting J may also be insulated from the cover K by means of asbestus or other suitable material that is a bad conductor of heat.

J′ is a passage that serves as a flue for heated gases arising from a lamp or burner arranged below the heating device, as shown.

In order to obtain the requisite heat to attain good results, we find it desirable to employ a Bunsen burner of the kind forming the subject of another application filed by us for Letters Patent of the United States of even date herewith, Serial No. 363,013, and it is to be understood, therefore, that the construction of burner in question is not herein claimed as forming any part of the present invention. In this burner 1 is a gas-generator or oil-vaporizor, 5 a jet-piece with gas-orifice, 6 a bent mixing-tube with air inlet or inlets at $6^a$ and a perforated combustion-plate 12. Gas or vapor issuing through the jet-piece 5 into the mixing-tube 6 draws air through the air inlet or inlets and the gas and air become mixed in passing through the tube 6, in traveling through which the mixture is heated by reason of the apparatus being arranged as shown.

By the construction described the heating device will be quickly heated by the hot gases ascending the flue J′, the hot gases from the lamp first surrounding the tubular portion M and then passing between the other tubular portions M′. The tortuous form thus given to the passage or flue for the lamp-flame or hot gases greatly facilitates the transference of heat to the tube or conduit M and vessel M′. The check-valve N is arranged to open when necessary and allow the gas or vapor made in the tubular portions or vessel M′ of the heating device to pass into the other portion M and thence into the cylinder, it may be, through a perforated nozzle O, that extends into the cylinder and is in communication with the tube or conduit M.

P is the spray-injector, arranged to deliver hydrocarbon and air into one of the tubular portions M′ of the heating-chamber. This spray-injector is constructed so that the entering hydrocarbon may be broken up into spray by the air that is drawn through it by the action of the main piston B on the suction-stroke of the engine. The air thus drawn in is, in the example shown, drawn through an air space or jacket $J^2$, partly surrounding the heated vessel M′ and tube or conduit M; but the air for the spray-injector P may be heated in any other convenient way, if desired. For instance, it may be drawn from a jacket surrounding the chimney Q, which forms a continuation of the flue J′. The section in Fig. 5 is taken partly through the spray-injector and partly through the heating device M M′ in the plane of the center line of the cylinder. The course of the spray or gas or vapor from the spray-injector to the cavity above the check-valve N is clearly shown by Figs. 3 and 5.

Fig. 7 is a vertical section, partly in elevation, of a modified construction of heating device for heating the hydrocarbon on its way from the spray-injector to the cylinder. This heating device comprises an inner tube or chamber $a$ in communication with the cylinder, an outer heating-chamber $a'$ or chambers $a^2$ $a'$ surrounding the said inner tube or chamber $a$, and in which hydrocarbon mixed with air or air alone as well as hydrocarbon mixed with air can be heated, a pipe or passage $a^3$ for conveying heated gas or vapor from the outer chamber $a'$ (or chambers) to the inner tube or chamber $a$, and a check-valve N, whereby the flow of heated gas or vapor through the said pipe or passage $a^3$ can be controlled. This modified form of heating device can be provided with a perforated nozzle O, like that shown with the heating device illustrated in Figs. 3, 4, and 5.

P is the spray-injector, which when the apparatus is in use is connected with a pump for delivering hydrocarbon, as in Figs. 1 to 6. The spray from this spray-injector is delivered into the outer heating-chamber $a'$, together with air that is caused by the inducing action of the injector P to flow, as indicated by arrows, through outer heating-chamber $a^2$, wherein it is heated by contact with the inner tube or chamber $a$. The mixture of heated air with hydrocarbon spray after entering the chamber $a'$ and passing around the tube or chamber $a$, and thus becoming vaporized, is admitted into the pipe or passage $a^3$ past the check-valve N, when this valve is opened, and into tube or chamber $a$, whence it flows into the cylinder through the perforated nozzle O. When ignition takes place in the cylinder, the sudden elevation of pressure drives the flame up into the inner tube or chamber $a$, which is consequently kept hot when the engine is running. The tube or chamber $a$ can be secured to the cylinder-cover K, as in Figs. 3, 4, and 5, and may advantageously be insulated therefrom, so that it shall be cooled as little as possible by contact with such cover. A lamp constructed with a special burner, like that shown in Fig. 5, is used with this heating device. This lamp is arranged below a muffle or flue $b$, enveloping the lower portion of this heating device, and serves to heat the same at starting. The lamp may be extinguished after the engine has been working some time.

We find that when the heated tube or chamber M, Figs. 3, 4, and 5, or $a$, Fig. 6, is used to fire the compressed charge in the cylinder a deposit of soot or carbon is gradually set up in such heated tube or chamber, and also that, especially in large engines, it is advisable to provide a timing-valve to determine the exact point at which ignition shall take place. To prevent the deposit of soot or carbon in such portions of an engine, we provide a small snifting-valve, arranged as shown at N′, Figs. 5 and 7, to open inward, so that on the suction-strokes of the engine a small quantity of air is drawn therein and creates a current through the said tube or chamber in such a manner as to prevent the settlement of the carbon therein. By holding such snifting-valve open during the compression-stroke of the engine, as when starting the engine, a slight leakage is allowed to take place through the chamber or tube, which prevents ignition, and on the valve being closed at or near the end of the compression-stroke ignition takes place.

The check-valve N in each arrangement of heating device can be operated and controlled in any convenient manner, and is so arranged that on the engine attaining a speed in excess of the maximum for which it is adjusted by the governor will put the valve out of action and no gas or vapor will be taken into the cylinder. An arrangement of governor for this purpose is shown in Figs. 1, 2, and 4, and is as follows: A small bowl or roller F′, mounted on a stud attached to the spindle of the valve F, engages (at the time of opening of the air-ports) with a cam or lever U, which, by means of the links or catch-rods U′ U″ and a lever V, causes a rocking shaft V′ to be partially rotated, and by means of a tappet V″ depress the spindle of the check-valve N. A spiral spring on the shaft V′ serves to bring the the tappet back to a position of rest in which the tappet ceases to depress the valve-spindle. The links or catch-rods U′ U″ are made, as shown in Fig. 1, with undercut projections or teeth to engage with one another. When these projections or teeth are in gear, the links U′ U″ act as one piece, being in tension. Should the speed of engine rise beyond the desired maximum, a small tumbler $V^4$, operated by a rod $V^5$ from the engine-governor, (which is shown in Figs. 1 and 2 as driven by the gearing R,) will lift the link or catch rod U″ out of gear with the link or catch-rod U′, so that the shaft V′ and valve N will not then be operated. The shaft V′ also serves to operate the pump for measuring off the correct amount of hydrocarbon necessary for successive working-charges in in the cylinder.

In order to measure off the correct amount of hydrocarbon necessary for successive working-charges in the cylinder, we employ a pump constructed as shown in Figs. 1, 2, and 6. This pump (marked T in Figs. 1 and 2) comprises a tube or vessel T′, (conveniently an oval or flattened tube,) having but one opening into it and connected by that opening to a chamber provided with suction and delivery valves $x$ $x$, the suction-valve being in connection by a pipe with a reservoir of petroleum, which it is advantageous should be placed at a higher level. The said tube or vessel is caused to vibrate, bend, twist, or otherwise vary its form in such a way that its contained volume is alternately diminished and increased.

In the arrangement shown the free closed end of the tube T′ is moved by the lever W and rod W′, which in turn derives its motion from a lever $W^2$ on the rocking shaft V′ Figs. 1 and 2. As is well known, an alteration of shape of such a tube will cause an alteration of the internal volume or capacity of the tube. Consequently when the lever W presses against the free end of the tube T′ and tends to open or uncoil the same its volume will be increased, and a quantity of hydrocarbon in excess of that in the tube before it was partly opened or uncoiled will be drawn in. When the lever W releases the tube, the latter will recover its shape and expel the oil so drawn in, the small check-valves $x$ $x$ serving as suction and delivery valves and compelling the oil so pumped to be delivered by the tube $x'$ to the spray-injector P, or, conversely, the oil may be ejected by distorting the tube. The shaft $v'$ thus controls the valve N and the pump T.

The working of an engine on the two-revolution cycle with the above-described arrangements for supplying and heating hydrocarbon is as follows: Assuming the engine to be running and the piston B to be making an outstroke—i. e., toward the crank—the sliding valve F will be so moved by the gearing R (shown in Figs. 1 and 2) as to admit air to the cylinder from the pipe H through the regulator cock or valve I. The valve E will also be open, being mechanically operated by means of the bell-crank lever S and rod S′, which in turn are also operated by the gearing R. The entrance of air to the cylinder being restricted by the cock or valve I, a partial vacuum will be formed in the cylinder during this the charge-stroke. During this outstroke when the engine is running at or slightly under its normal speed the check-valve N will be opened by the tappet V″ and air will be drawn in through the spray-injector P and through the passages M M' and perforated nozzle O into the cylinder, together with hydrocarbon delivered to the spray-injector P by the pump T. At the end of the charge-stroke, the cylinder being filled or partially filled with a combustible charge, the valves E and N close and the return or compressing stroke is made. At the end of the compressing-stroke the mixture is fired and the next or working stroke is made.

In order to ignite the compressed charge in the cylinder, we may use an electric spark obtained from an intensity coil and battery, or a small alternating-current dynamo, driven by the engine, may be used for providing the primary current for the coil, and the usual contact-breaker may thus be dispensed with; or, in places where illuminating or other gas is obtainable, a heated tube communicating with the interior of the cylinder may be employed in a manner now well known. We find, however, that the arrangements hereinbefore described, and consisting, essentially, of a small tube or chamber M, Figs. 3, 4, and 5, or $a$, Fig. 6, external to the cylinder and kept hot either by a lamp (as at starting the engine) or by successive ignition in the cylinder, causing the flame to penetrate such tube or chamber and keep it hot, (with or without the perforated nozzle O, which forms with the tube or chamber a heater or final drier of the spray or vapor,) are of themselves sufficient to cause ignition of the charge when the same is compressed. At the end of the working-stroke the valve E will be lifted and, the slide-valve F having opened communication with the exhaust-pipe G, the waste gases are expelled and the cycle recommences, the valve E remaining open for the next charge-stroke.

It will generally be found desirable at starting the engine when nearly cold to increase the rarefaction in the cylinder during the first few outstrokes in order to assist the vaporization of the hydrocarbon. This may conveniently be done by the valve I on the air-suction pipe H.

We have succeeded in working an engine on the two-revolution cycle above described with a consumption of oil of the kind known as "royal daylight" amounting to only .97 pints per brake horse-power per hour, including that used by the burner, the engine having a cylinder of seven inches bore and fifteen inches stroke and running at two hundred revolutions per minute, giving seven horse-power on the brake.

What we claim is—

1. In a liquid-hydrocarbon motor-engine, the combination, with the motor-cylinder, of a heating device comprising a vessel or chamber capable of being heated by a lamp and into which the charge of hydrocarbon is delivered, a tube or chamber in communication with said cylinder, a pipe or passage connecting said vessel or chamber with said tube or chamber, and a valve operated by and connected with the operating mechanism of the air admitting and charge-exhausting valve, and connected with and controlled by the engine-governor, whereby said pipe or passage can be controlled, substantially as herein described.

2. In a liquid-hydrocarbon motor-engine, the combination, with the motor-cylinder, of a heating device comprising a vessel or chamber capable of being heated by a lamp and into which the charge of hydrocarbon is delivered, a vessel or chamber capable of being heated and through which air can flow, an injector communicating with said hydrocarbon and air chambers, means, substantially as described to force oil through said injector, and thereby draw air from the air-heating chamber and discharge it with the oil into said hydrocarbon-chamber, a tube or chamber in communication with said cylinder, a pipe or passage connecting said vessel or chamber with said tube or chamber, and a valve whereby said pipe or passage can be controlled, substantially as herein described.

3. In a liquid-hydrocarbon motor-engine, the combination, with the motor-cylinder, of an injector for liquid hydrocarbon, an air-heating chamber communicating with said injector, a pump to force oil through said injector, and a heating device comprising a vessel or chamber into which hydrocarbon in the form of spray mixed with heated air is delivered by said injector, a tube or chamber in communication with said cylinder, a pipe or passage connecting said vessel with said tube or chamber, and a valve controlled by the engine-governor to control said pipe or passage, substantially as herein described.

4. In a liquid-hydrocarbon motor-engine, the combination, with the motor-cylinder, of a heater comprising a casting J, with a tubular portion M', into which hydrocarbon spray can be delivered, a tubular portion M in communication with said cylinder, a passage $M^2$, connecting said portions M M', a check-valve N for controlling said passage, an air space or jacket $J^2$ and a flue J', and an injector P, arranged to draw air through said air space or jacket $J^2$ and deliver the same with hydrocarbon to the tubular portion M', substantially as herein described, for the purpose specified.

5. In a liquid-hydrocarbon motor-engine, the combination, with the motor-cylinder, of a heating device comprising a charge-heating tube or chamber in direct communication with said cylinder and provided with an inlet for successive charges of partly-heated gas or vapor and a snifting-valve capable of admitting air to said tube or vessel at each suction-stroke of the engine, said tube or chamber being so arranged that a portion of each charge exploded in the cylinder will pass into and heat said tube or chamber, substantially as herein described, for the purpose specified.

6. In a liquid-hydrocarbon motor-engine, the combination, with the motor-cylinder, of a tube or chamber in communication with said cylinder, and provided with an inlet for successive charges of partly-heated gas or vapor, a snifting-valve capable of admitting air to said tube or chamber on the suction-stroke of the engine, and a perforated nozzle extending into said cylinder and through which a portion of each charge exploded in the cylinder can pass into and heat said tube or chamber, substantially as herein described, for the purpose specified.

7. In a liquid-hydrocarbon motor-engine, the combination, with the motor-cylinder, of a pump for supplying hydrocarbon to said cylinder and consisting of a flexible elastic closed vessel, the form of which can be varied in such a way that its contained volume can be alternately diminished and increased with pressure, said vessel having a single aperture opening into one chamber, communicating, respectively, with the cylinder and with an oil-supply suction and delivery valves for controlling the flow of hydrocarbon to and from said chamber, and means for bending or otherwise varying the form of said vessel, substantially as herein above described, for the purpose specified.

8. In a liquid-hydrocarbon motor-engine, the combination, with the motor-cylinder, of a pump for hydrocarbon, consisting of a partially coiled or bent tube closed at one end, a vessel in communication with the interior of said tube, and provided with inlet and outlet passages in communication with a reservoir of hydrocarbon and with the cylinder, respectively, suction and delivery valves for controlling the flow of hydrocarbon to and from said tube, a lever arranged to act against said tube to vary its form and alternately increase and diminish its contained volume, and means for operating said lever, substantially as herein described.

9. In a liquid-hydrocarbon motor-engine, the combination, with the motor-cylinder, of a heating device comprising a heating vessel or chamber into which hydrocarbon can be delivered, a tube or chamber in communication with said cylinder, a pipe or passage connecting said vessel and tube, and a valve, controlled by the engine-governor, controlling the passage through said pipe, an injector arranged to deliver hydrocarbon spray and air into said vessel, and a pump, substantially as herein described and shown, arranged to deliver measured quantities of hydrocarbon to said injector, as and for the purposes set forth.

10. In a liquid-hydrocarbon motor-engine, the combination of a motor-cylinder, a pump for delivering a measured quantity of hydrocarbon for each working-stroke, a heating device through which said hydrocarbon passes on its way to said cylinder, a valve, such as N, for controlling the flow of hydrocarbon through said heating device, and means for operating said valve, a distributing-valve for controlling the admission of air to and the exhaustion of gases from said cylinder, substantially as herein described, for the purpose set forth.

11. In a hydrocarbon motor-engine, the combination of a motor-cylinder, a pump T for delivering measured quantities of hydrocarbon, a spray-injector into which said hydrocarbon is delivered, a heating device formed with a passage or conduit through which said hydrocarbon passes on its way to the cylinder, a check-valve N, that normally closes said passage, a governor, and means for operating said pump and for opening said valve, said means being controlled by said governor and capable of being put out of action when the speed of the motor becomes excessive, substantially as herein described.

12. In a hydrocarbon motor-engine, the combination of a motor-cylinder, a pump for delivering measured quantities of hydrocarbon, an injector into which said hydrocarbon is delivered, a heating device formed with a passage or conduit through which hydrocarbon can pass on its way to said cylinder, a check-valve N, that normally closes said passage, a governor, a rock-shaft V, provided with a lever V'' arranged to act upon said check-valve, and a lever $W^2$, adapted to operate said pump, and means, substantially as described, for operating said rock-shaft and adapted to be put out of operation by said governor, substantially as herein described, for the purpose set forth.

In testimony whereof we have signed our names to this specification in the presence of two subscribing witnesses.

HERBERT LINDLEY.
THOMAS BROWETT.

Witnesses:
S. B. BOARDLEY,
FRED. A. CLIFFE,
*Both clerks, London Works, Salford.*